United States Patent [19]

Wiley

[11] Patent Number: 4,739,332
[45] Date of Patent: Apr. 19, 1988

[54] FANBEAM INVERSION RADAR

[75] Inventor: Carl A. Wiley, Los Angeles, Calif.

[73] Assignee: Hughes Aircraft Company, Los Angeles, Calif.

[21] Appl. No.: 651,198

[22] Filed: Sep. 17, 1984

[51] Int. Cl.$^4$ ............................................. G01S 13/89
[52] U.S. Cl. ................................................... 342/180
[58] Field of Search .................. 343/17, 5 CM, 5 FT, 343/5 NQ, 5 SA, 17 R, 5 MM, 400, 401, 428; 342/180, 81, 98, 99, 160, 195, 179

[56] References Cited

U.S. PATENT DOCUMENTS

| 3,792,423 | 2/1974 | Becker et al. | 342/180 X |
| 3,887,917 | 6/1975 | Howard et al. | 342/180 |
| 3,971,020 | 7/1976 | Howard | 342/180 X |
| 4,095,223 | 6/1978 | Howard | 342/180 X |
| 4,134,113 | 1/1979 | Powell | 343/5 CM |
| 4,204,210 | 5/1980 | Hose | 343/5 CM |
| 4,527,161 | 7/1985 | Wehner | 342/180 X |

OTHER PUBLICATIONS

H. Iams et al., "Stereoscopic Viewing of Cathode-Ray Tube Presentations"; RCA Review; (vol. 9, No. 1; 3/48; pp. 149–158).
K. Milne, "The Combination of Pulse Compression with Frequency Scanning for Three-Dimensional Radars"; The Radio and Electronic Engineer; (vol. 28, No. 2; 8/64; pp. 89–106).
W. Evanzia, "Faster, Lighter 3-D Radars in Sight for Tactical Warfare"; Electronics; (6/66; pp. 80–90).
H. Ebert, "Beam Radar"; AGARD Conference Proc. No. 197 on New Devices, Tecniques, and Systems in Radar; (The Hague, Neth.; 6/76; pp. 20-1 to 20-13).
"Side-Looking Radar Erstatter Visuel Inspektion", by A. Sondergaard; Elektronik (Denmark; #11, 11/79; pp. 22–27).

Primary Examiner—Theodore M. Blum
Assistant Examiner—Bernarr Earl Gregory
Attorney, Agent, or Firm—S. M. Mitchell; M. J. Meltzer; A. W. Karambelas

[57] ABSTRACT

A fanbeam inversion radar system (100) includes a frequency synthesizer (102) or other transmission means, a fanbeam antenna (104), an orientation sensor/controller (106) and a computer (110). The antenna is adapted for frequency scanning so that fanbeam position data is determined by the computer which controls the variable frequency synthesizer. By scanning a scene with fanbeams for each of a series of fanbeam orientations spanning 180°, a two-dimensional image reconstruction can be performed by algorithms well known in image processing fields.

By presorting radar returns by delay time (at 112), multiple reconstructed images can be obtained corresponding to different ranges. By mixing (at 122) the synthesizer output with a reference from a local oscillator (120) and "beating" the return against the same reference by means of synchronous demodulators (132), Doppler sorting can provide multiple images with respective relative velocities.

The radar system (100) uses serial frequency scanning. Also disclosed are parallel frequency scanning and mechanical scanning. An antenna for use in the frequency scanning systems is also provided.

14 Claims, 3 Drawing Sheets

FANBEAM INVERSION RADAR

BACKGROUND OF THE INVENTION

The present invention relates to radar systems, and more particularly to a radar system using image reconstruction by fanbeam inversion.

Radar systems have many applications, e.g. military and commercial tracking systems and meterological mapping. Classical radar systems use spot or pencil beam antennas which scan a scene pixel by pixel. The pencil beam is formed by a reflector dish or a planar array. Two limitations pertain to these systems, the size and weight of the reflector or array, and the scintillation of a small target due to the fact that each pixel is sampled only once per image cycle. This scintillation is a problem where continuous tracking of small objects is critical.

Synthetic Aperture Radar (SAR) systems are known which provide considerable savings in size and weight. However, since the return times of the signals are used to determine cross-track position on a surface, SARs are not well adapted to measure range. In other words, while SAR devices are capable surface mappers, they are limited for volumetric imaging required for meteorological mapping and volumetric tracking.

What is needed is an improved volumetric imaging radar with relatively low mass and bulk. Furthermore, it is desirable to have a radar system with more frequent or continuous observation of each pixel to avoid scintillation gaps in the imaging.

SUMMARY OF THE INVENTION

A radar system includes a fanbeam antenna to reconstruct images by fanbeam inversion. A fanbeam antenna scans a scene with a series of fanbeams to obtain profiles. Successive profiles are obtained at a series of rotational positions of the scene permitting reconstruction of the scene according to techniques widely applied in various image reconstruction technologies.

The antenna may be a line-source or other fanbeam antenna, and may scan in parallel or series. The scanning may be mechanical or electronic. Electronic scanning may be according to frequency, phase gradient or true time delay.

The antenna is fed by a signal source, which can be pulsed or continuous. The signal source can be a variable frequency synthesizer or plural frequency synthesizers which operate either in parallel or in series. Where the frequencies are fed in series, continuous, stepped and arbitrarily hopped approaches are provided.

The received reflections may be sorted by return time to determine target distance to provide for volumetric imaging. The reflections can be beat against transmission frequencies to determine relative velocity of the target and the antenna. The sorted or unsorted returns can be assembled to form one or more profiles or other one-dimensional functions representing the scene.

Rotating means provide for relative movement of the fanbeams and the scene so that the one-dimensional functions can be obtained for a series of relative rotational positions. Corresponding one-dimensional functions obtained at successive rotational positions can be mathematically transformed to provide a two-dimensional representation of the scene.

In accordance with the above, an improved radar is presented capable of volumetric imaging. Directional data is available through the two-dimensional image reconstruction algorithms. In contrast to SARs, range and relative velocity data are determinable as in classical radar systems.

The present invention provides the resolution of a classical radar system with a linear antenna whose length corresponds to the diameter of a comparable reflector or planar array system. Thus, in the present system, mass is proportional to the resolution, whereas mass increases by the square of the desired resolution in a classical radar system.

Furthermore, in classic radar, each pixel is sampled once per scan, whereas in the present invention, each pixel is sampled continuously or at least once per rotational position. Thus, the more frequent sampling provides much better averaging and less problem with scintillation in fast tracking applications.

DESCRIPTION OF THE PREFERRED EMBODIMENTS

Figure 1:
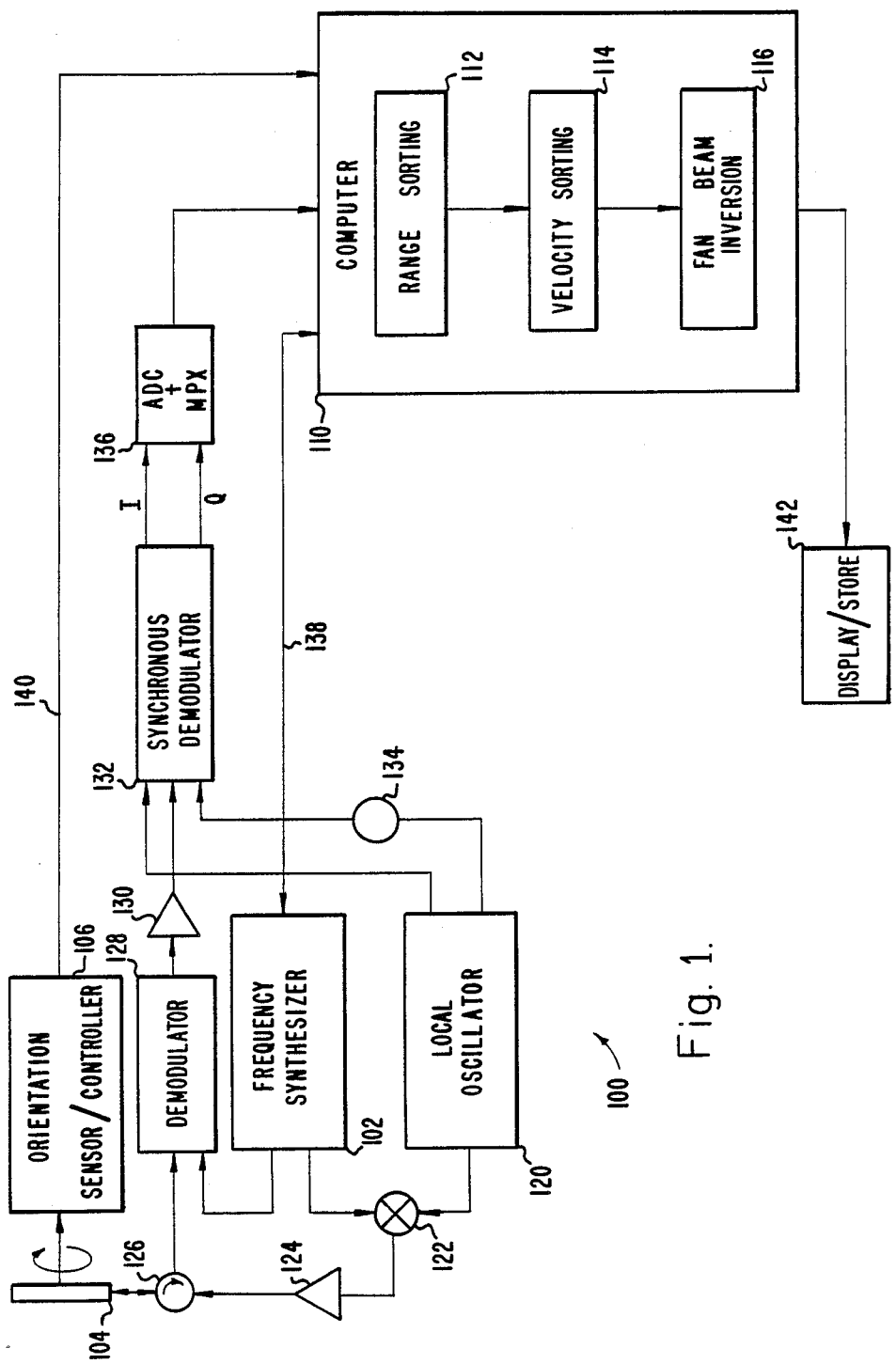
FIG. 1 is a schematic of a serial frequency scanning radar system in accordance with the present invention.

A fanbeam inversion radar system 100, illustrated in FIG. 1, includes a frequency synthesizer 102 or other signal generating means, a frequency-scanning fanbeam antenna 104, an orientation sensor/controller 106 and a computer 110 for accumulating scene data and reconstructing images from the output of the antenna 104. The frequency synthesizer 102 generates pulses. Each pulse comprises a signal with a predetermined frequency within the operating range of the frequency synthesizer 102.

The output of the frequency synthesizer 102 is mixed with the constant output of a local oscillator 120. The output of the mixer 122, which is single sideband, is the sum of the frequencies of the frequency synthesizer 102 and the local oscillator 120. An amplifier 124 boosts the mixer output, which is then directed to a transmit/antitransmit switch (TR/ATR) 126.

The TR/ATR 126 is a two-position switch. In one position, the TR/ATR 126 permits the modified frequency synthesizer output to be directed to the antenna 104. In the other position, the TR/ATR 126 directs the antenna voltage output to a demodulator 128. With TR/ATR 126 in the first position, the fanbeam inversion radar system 100 is in a transmit mode, and with the TR/ATR 126 in the second position, the fanbeam inversion radar system 100 is in a receive mode.

With the TR/ATR 126 in the transmit position, the modified frequency snythesizer signal is directed to the fanbeam antenna 104 and propagated thereby. The signal is propagated along a fanbeam, the position of which is uniquely determined by the snythesized frequency.

The antenna 104 can receive reflected energy from a target within the fanbeam. Since the frequency of the reflected signal is the same as the transmitted signal, plus or minus a relatively small Doppler shift, energy is received along the same fanbeam used in transmission.

The received signal is directed to a demodulator via the TR/ATR 126. The TR/ATR 126 is switched rapidly to permit rapidly pulsed transmissions and reception of ensuring reflections.

The signal going into the demodulator 128 contains frequency, reflection time and Doppler information. The frequency information is a coded form of fanbeam position. In the illustrated system, this information is redundant, since it is obtainable from the setting of the frequency synthesizer 102. Thus, the antenna output can be demodulated with an input from the frequency synthesizer 102 without loss of information.

The demodulated signal has a frequency close to that of the local oscillator 120, and this lower frequency provides for more ready processing. The reflection time and Doppler data are preserved through the demodulation. The demodulated signal is amplified by an amplifier 130 for subsequent processing.

The demodulated and amplified antenna output is directed to a pair of synchronous demodulators 132. The local oscillator 120 provides signals, 90° phase shifted with respect to each other, to the respective synchronous demodulators 132. The phase shift is provided by a phase shifter 134 in one of the transmission lines to the synchronous demodulators 132.

The outputs of the synchronous demodulators 132 are the inphase and quadrature components of the received signal. The formation of the inphase and quadrature components permits the preservation of phase information in the signal. Subsequent digital processing is provided by an analog-to-digital converter and miltiplexer (ADC+MPX) 136. The output of the ADC+MPX 136 is directed to the computer 110.

In addition to the antenna output data, information concerning antenna orientation and frequency synthesizer output are available to the computer 110. In the present embodiment, the computer 110 drives the frequency synthesizer 102 through a transmission line 138, and thus already "knows" the fanbeam position associated with incoming reflection time and Doppler data. Information concerning antenna orientation is directed to the computer 110 along a transmission line 140 from the orientation sensor/controller 106. In an alternative embodiment, the computer controls antenna orientation directly, so no separate sensor system is required for the computer to acquire orientation data.

The data enters the computer 110 in the form of a matrix of intensity × phase × frequency × delay × Doppler × orientation data. The data are range sorted by delay (at 112), so that targets at different ranges are processed separately. The data are velocity sorted by Doppler frequency (at 114) so that targets moving at different relative velocities are processed separately.

Within each range × velocity "bin", intensity × phase × frequency × orientation data is collected for each of many, e.g. 180, resolvable relative orientations over a half circle. Since frequency is a coded version of fanbeam position, the data is in the form of intensity × phase × fanbeam position for successive orientations.

Subsequent analogous data is collected for each resolved relative orientation of the antenna and the scene and sorted by range and velocity. A fanbeam inversion algorithm is applied (at 116) for each range × velocity bin. The result is a collection of two-dimensional reconstructions, each corresponding to a given range and velocity. The resulting data are recombined by known means to provide three-dimensional "movies" of the scene. Of course, the data can be presented in alternative ways, depending on the application.

The fanbeam inversion algorithm can involve an inverse Radon transform. The Radon inversion is well-known in image reconstruction fields, including tomography. Since the fanbeams produced by a line-source frequency scanning antenna are conical rather than planar, a correction permits increased accuracy over a wide field of view in the illustrated system. The correction involves dividing the intensity from each fanbeam by the cosine of the angle it makes from the broadside direction of the antenna prior to performing the Radon inversion, and then multiplying the intensity associated with each point in the reconstructed image by the cosine of the angle defined by the spin axis and the line between the pixel and the point intersection of the spin axis and the antenna.

The result of the image reconstruction is stored or displayed as desired at the image display/store device 142. The reconstructed images for each range × velocity bin may be combined to provide a volumetric image with target movements appropriately represented.

The particular parameters of the radar system 100 are dependent on the application. The frequency synthesizer 102 in the illustrated system 100 operates from 14 to 15 GHz. This range is divided into 200 discrete frequencies to obtain $\frac{1}{2}$° resolution. Each discrete frequency is repeatedly pulsed for a period of 10 milliseconds. The frequency synthesizer 102 has a pulse repetition frequency (PRF) of 20 KHz, which achieves a reasonable compromise between ambiguity and resolution in range and velocity determinations.

In the radar system 100, the synthesized frequencies are stepped through sequentially. The operating frequencies may constitute a continuum or a series of discrete "stepped" frequencies. The latter arrangement is preferred when velocity sorting by Doppler beating is employed. Where discrete frequencies are employed, the addressing may be ordered or arbitrary. In arbitrary or "hopped" addressing, the fanbeam are addressed in an apparently random order to confuse would be counter measures.

Figure 2:
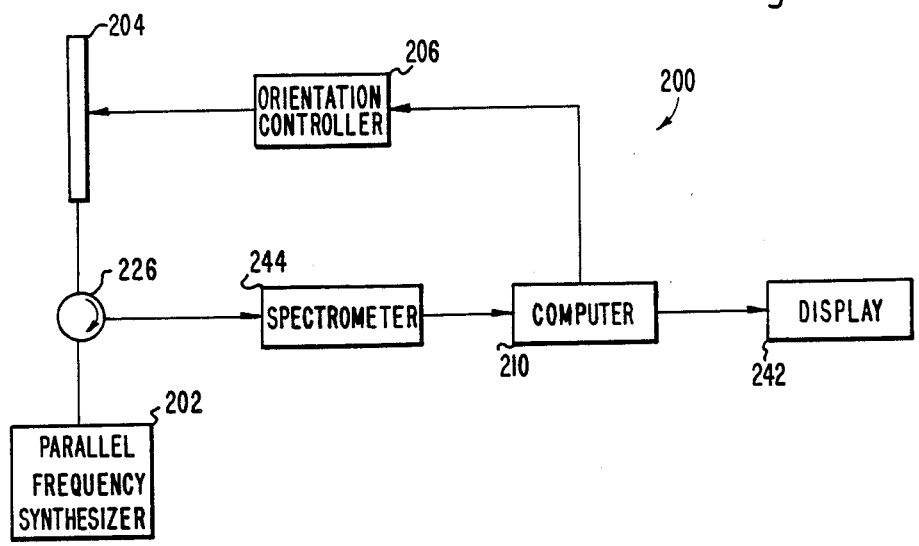
FIG. 2 is a schematic of a parallel frequency scanning radar system in accordance with the present invention.

Processing can be expedited by processing frequencies in parallel as illustrated in FIG. 2. Parallel processing allows continuous monitoring of each pixel, eliminating scintillation problems. In the parallel frequency scanning fanbeam radar system 200, a multitude, e.g. 200, of discrete frequencies are transmitted in parallel. The TR/ATR 226 functions similarly with the corresponding TR/ATR 126 in FIG. 1. The spectrometer 244 analyzes the reflections received by the antenna 204 into the same 200 frequencies that were transmitted. In this embodiment, the analog-to-digital conversion and multiplexing are integrated with the spectrometer.

A computer 210 regulates the orientation/controller 206 of the antenna 204, so antenna orientation data is always available to the computer 210. In the parallel frequency scanning system 200, the computer 210 does not communicate directly with the frequency synthesizer 202. Instead, the related fanbeam position is provided by the spectrum analyzer output.

The computer 210 provides range sorting and image reconstruction, as in the serial frequency scanning system 100. The illustrated parallel frequency scanning system 200 provides for volumetric imaging at a display device 242. Velocity data is provided by successive image reconstructions. In an alternative parallel frequency scanning system, the components and computer algorithms are provided to permit a Doppler analysis of the received reflections, in accordance with the teachings of the illustrated serial frequency scanning embodiment.

Figure 3:
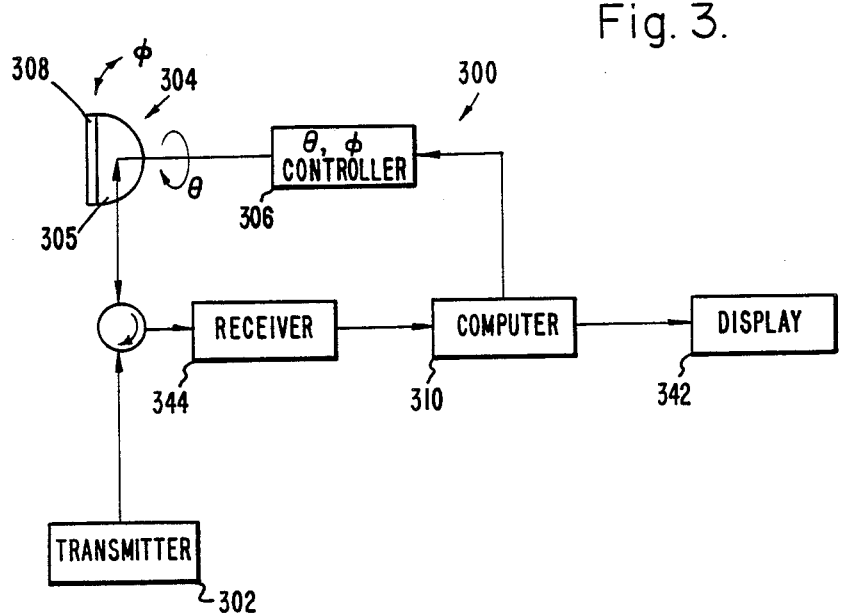
FIG. 3 is a schematic of a mechanically scanning radar system in accordance with the present invention.

A mechanically scanning fanbeam radar system 300 is illustrated in FIG. 3. The antenna 304 includes a "pillbox" reflector 305 with an elongated rectangular aperture 308. This arrangement produces a planar fanbeam elongated orthogonal to the elongation of the pillbox aperture 308. The single fanbeam is scanned by rocking the antenna 304 along the $\phi$ direction indicated in FIG. 3. Upon completion of each scan, the antenna 304 is rotated in the $\theta$ direction through 180°, with a rocking scan cycle effected at each intermediate incremental $\theta$ orientation. The rocking and rotation motions are governed by a controller 306 in response to commands from computer 310.

Throughout the rotation and rocking cycles, a transmitter 302 provides the signal to be transmitted by the antenna 304 via a TR/ATR 326. Received reflections are amplified and digitized by a receiver 344. The computer 310 correlates the receiver output with the scan position and orientation data it generates in controlling the antenna position. The resulting correlations are processed according to an inverse Radon transform to provide the desired volumetric image at the display device 342.

Figure 4:
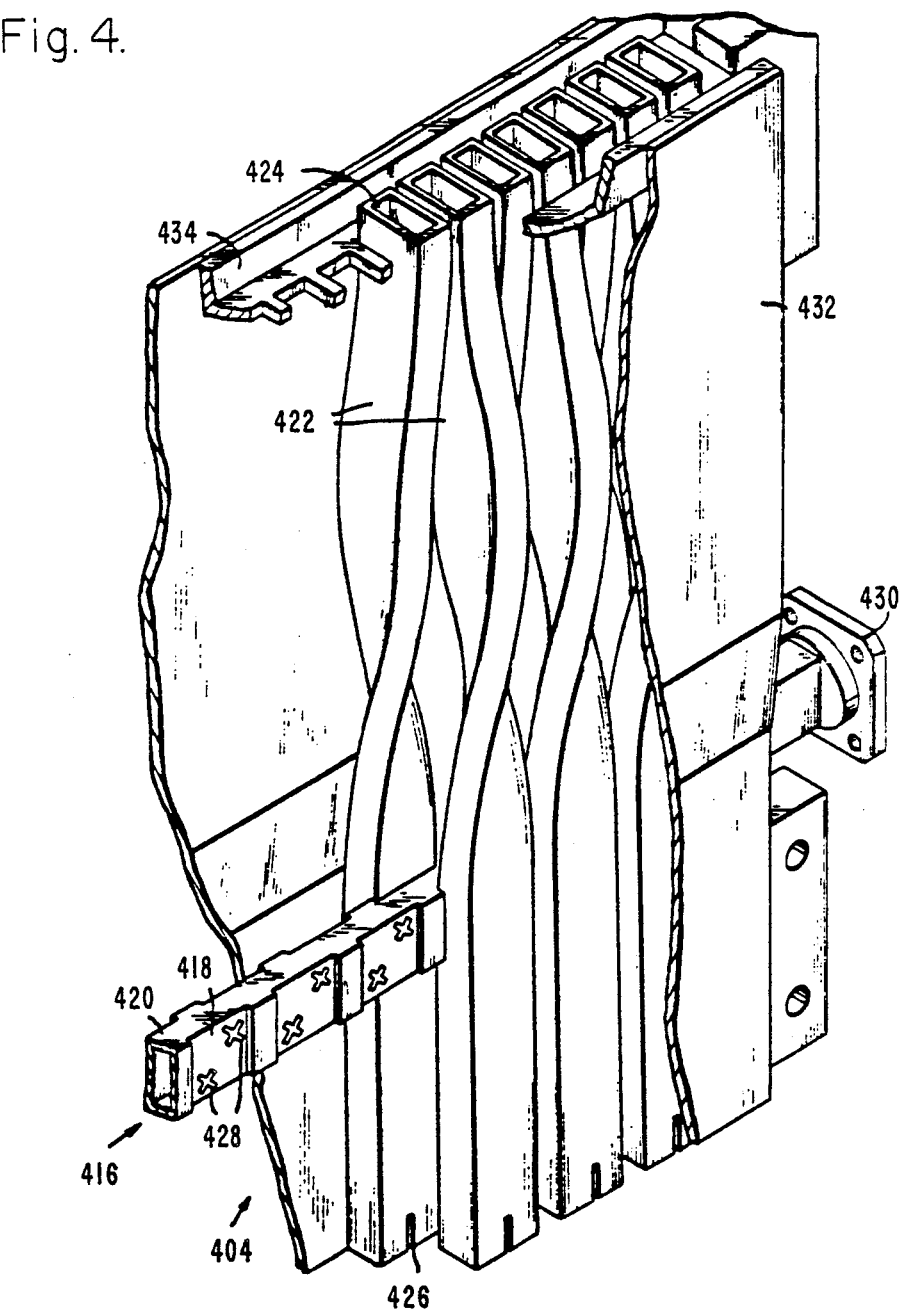
FIG. 4 is an antenna incorporable in frequency scanning radar systems in accordance with the present invention.

A frequency scanning antenna, such as might be employed in systems 100 and 200, and such as the antenna 404 of FIG. 4, may be considered as a waveguide with multiple radiators or slots. Since the wavelength of the energy traveling down the waveguide varies with frequency, the relative phase of the energy radiated from the slots varies also. At a frequency corresponding to a guide wavelength equal to the slot spacing, the energy will combine in the far field to form a maximum in the broadside direction. At frequencies other than multiples of the fundamental broadside frequency, the phases in each slot will be shifted relative to every other slot so that the energy will add up to a maximum only in another direction at some offset angle. Thus, the maximum varies smoothly as a function of frequency.

The frequency scanning antenna 404 employs one feed 416 with a rectangular cross section to support only a $TE_{01}$ mode. This means zero resonances parallel to the broad walls 418 and one resonance mode parallel to the narrow walls 420. In other embodiments, other modes, cross sections and feed structures are possible; e.g. rigid coaxial transmission line could be used.

The loads 426 at the ends of the radiating elements 422 and a feed load (not shown) absorb unwanted power from reflections. Radiating elements 422 are twisted so that they align with their broad walls adjacent at their radiating ends 424, and with narrow walls adjacent at the feed 416 and at the ends with loads 426.

The radiating elements 422 are staggered above and below the feed 416 foro compactness and to achieve an $M=\frac{1}{2}$ scan mode. This mode is accomplished since the staggering makes the signals received by the feed 416, from adjacent radiating elements, 180° out of phase.

The $M=\frac{1}{2}$ scan mode is desired so that the braodside field of view can be spanned. Without staggering or an alternative phase shifting technique, the $M=0$ mode would prevail, and only the forward half of the broadside field-of-view would be scanned. In this case, imaging would require 360° of rotation, rather than 180°.

Coupling between the radiating elements 422 and the feed 416 is provided by Moreno couplers 428 in the form of cross-shaped holes. These couplers 428 are selected for their broad bandwidth capabilities, required by the frequency scanning antenna. The couplers 428 are arranged to couple the paths between the radiating ends 424 and feed port 430 and the paths between the radiating element loads 426 and the feed load so that direction signals are received at and reflections are diverted from the feed port 430.

Structural elements 432 providing support, rigidity and protection from space radiation or other environmental factors are employed according to the intended application. The radiating end of antenna 404 includes a trough 434 to damp surface waves and to prevent their coupling to the radiating elements and causing beam dropouts. The beam dropouts would show up as beam holes in the antenna output, and hence the microwave spectrum. Alternatively, dielectric plates over the radiating element ports, could be used.

The illustrated antenna 404 is designed for a frequency bandwidth of about 12 to 18 GHz; and may be about 150 inches along the feed, 10 inches along the radiating elements and 1.7 inches thick. The radiating elements comprise three hundred twisted waveguides on a 0.502 inch pitch. The feed and radiating element cross sections are about 0.702 inch by 0.391 inch.

There are many alternative embodiments of the present invention. Different frequency scanning antennas could be used. For example, different frequency scan range and different frequency scan designs could be uesd.

In alternative embodiments, other scanning approaches are utilized in accordance with the present invention. Phase gradient and true time delay scanning approaches are incorporated. Both approaches are implemented serially and in parallel. Furthermore, it is not necessary that the antenna be driven to rotate. A space-based antenna maintains rotation without substantial power. In one embodiment, there is no physical rotation of an antenna. Instead, a circular array is excited along successive rotationally displaced diameters to provide the projection data for the fanbeam inversion algorithms.

In addition to the foregoing illustrative embodiments, other modifications and variations are within the ken of those skilled in the art. Accordingly, the scope of the present invention is limited only by the scope of the following claims.

What is claimed is:

1. A radar system for volumetric imaging of a scene, comprising:
   a frequency scanning antenna for providing an output as a function of radiation received along fanbeams and for providing radiation transmissions along fanbeams in response to inputs, said fanbeams collectively spanning said scene, said fanbeams each having a relative rotational position with respect to the scene different from the relative rotational position of at least most of the other fanbeams;
   transmission means for providing inputs of at least several predetermined different frequencies to said antenna to effect transmissions along said fanbeams, with the relative locations of the transmissions along each respective fanbeam being a function of the predetermined frequencies;

means for rotating said fanbeams relative to said scene to orient each fanbeam along its relative rotational position;

orientation means for providing an output as a function of the rotational positions of said fanbeams;

computing means coupled to the transmission means, rotating means and orientation means comprising;

means for transforming said outputs from said antenna and said orientation means into onedimensional reflected radiation functions each having a respective rotational position and a respective location dependent upon frequency along its respective rotational position; and means for reconstructing selected attributes of the scene from said radiation functions and their respective rotational positions and locations.

2. The radar system of claim 1 in which the computing means further comprises;

range sorting means for separating received reflections present in the radiation received along fanbeams by the delay between transmission and reception, said range sorting means providing a series of outputs, each corresponding to a predetermined approximate range.

3. The radar system of claim 2 further characterized in that said transform means provides a onedimensional reflected radiation for each distinct range for each respective rotational orientation, and said computing means is adapted for providing multiple two-dimensional reconstructions of said scene, each two-dimensional reconstruction corresponding to a respective range.

4. The radar system of claim 1 in which the computing means further comprises:

velocity sorting means so that the relative movement of scene components can be determined.

5. The radar system of claim 4 further characterized in that said velocity sorting means includes means for detecting a beat frequency between a transmission at a given frequency and its reflection.

6. The radar system of claim 1 further characterized in that said transmitter means includes a frequency synthesizer adapted for serially generating frequencies.

7. The radar system of claim 1 further characterized in that said transmitter means includes a frequency snythesizer adapted for parallel generation of multiple frequencies.

8. A radar system for volumetric imaging of a scene comprising:

means for generating a plurality of radio frequency signals having different predetermined frequencies;

a frequency scanning antenna for providing output signals as a function of radiation received along fanbeams and for providing radiation transmissions along fanbeams in response to input signals, each of the fanbeams having a relative rotational position with respect to the scene different from the relative rotational position of at least most of the other fanbeams;

means coupled to the antenna for rotating the fanbeams relative to the scene and to one another to orient each fanbeam along its relative rotational position;

orientation means for providing an output as a function of the rotational positions of the fanbeams;

means for directing the signals from the generating means to the antenna and for receiving the output signals from the antenna;

means for demodulating the signals received from the antenna and the generating means to provide an output signal that has in phase and quadrature components; and computing means responsive to the generating means, demodulating means and orientation means for transforming the output signals from the antenna and the orientation means into onedimensional radiation functions, each of the one-dimensional functions having a respective rotational position and a respective location dependent upon frequency along its respective rotational position, and the computing means also being for reconstructing the scene from the onedimensional functions.

9. The radar system of claim 8 in which the signal generating means is a frequency synthesizer.

10. The radar system of claim 9 in which:

the demodulating means comprises a first demodulator for receiving signals from the antenna and the frequency synthesizer and for outputting a demodulated signal,and means coupled to the first demodulator for amplifying the demodulated output signal: and the directing and receiving means includes a transmit-/antitransmit switch.

11. The radar system of claim 10 further comprises:

an oscillator for providing signals along a pair of transmission paths;

means coupled to one of the transmission paths for phase shifting the signal thereon;

means for mixing the signals received from the frequency synthesizer and the oscillator, the mixing means being coupled to transmit/antitransmit switch;

a second demodulator for receiving the amplified demodulated output signal, a signal from the oscillator and the phase shifted signal from the oscillator, the second demodulator providing an output signal that has in-phase and quadrature components; and means coupled to the computing means for multiplexing and converting the output signal from the second demodulator to digital signals.

12. The radar system of claim 8 in which the directing and receiving means includes a transmit/antitransmit switch, the antenna rotates during operation of the radar system, and the orientation means includes a sensor for detecting the current rotational position of the antenna.

13. In a radar system, a method for volumetric imaging of a scene, comprising the steps of:

(a) generating a plurality of radio frequency signals having different predetermined frequencies;

(b) orienting a frequency scanning antenna for the production of a plurality of fanbeams distinctly positioned relative to the scene and to one another;

(c) directing the signals to an antenna:

(d) determining the positional orientation of the antenna relative to the scene for each distinctly positioned fanbeam produced thereby, (e) providing radiation transmissions to the scene along fanbeams from the antenna, with the relative locations of the transmissions along each respective fanbeam being a function of the predetermined frequencies;

(f) receiving radiation transmissions of the scene along fanbeams;

(g) demodulating the radiation transmissions to provide an output signal that has in-phase and quadrature components;
(h) transforming the output signal into onedimensional radiations functions each having a respective positional orientation and a respective location dependent upon frequency along its respective positional orientation; and
(i) reconstructing an image of the scene from the onedimensional functions and their respective positional orientations and locations.

14. A radar system for volumetric imaging of a scene comprising:
a frequency-scanning antenna for providing an output as a function of radiation received along fanbeams and for providing for radiation transmissions along fanbeams in response to inputs, said fanbeams collectively spanning said scene, with said fanbeams each having a relative rotational position;
transmission means for providing inputs of at least several predetermined different frequencies to said antenna to effect transmissions along said fanbeams, with the relative locations of the transmissions along each respective fanbeam being a function of the predetermined frequencies;
means for rotating said fanbeams relative to said scene;
orientation means for providing an output as a function of the rotational positions of said fanbeams;
computing means coupled to the transmission means, rotating means and orientation means comprising:
transform means for transforming said outputs from said antenna and said orientation means into one-dimensional reflected radiation functions having a respective rotational position and a respective location dependent upon frequency along its respective rotational position, the transform means also being for providing a one dimensional reflected radiation function for each distinct range of each respective rotational position; and
means for reconstructing the scene from said radiation functions and their respective rotational positions and locations, the reconstructing means providing multiple two-dimensional reconstructions of said scene, each of the two dimensional reconstructions corresponding to one of the distinct ranges.

* * * * *